United States Patent [19]

Kawabata

[11] Patent Number: 5,041,977
[45] Date of Patent: Aug. 20, 1991

[54] ACTIVELY CONTROLLED SUSPENSION SYSTEM WITH FAIL-SAFE OPERATION IN RESPONSE TO FAILURE OF SENSOR FOR MONITORING VEHICLE ATTITUDE CHANGE

[76] Inventor: Kazunobu Kawabata, 4688-1, Sobudai 3-chome, Zama-shi, Kanagawa-ken, Japan

[21] Appl. No.: 261,870

[22] Filed: Oct. 25, 1988

[30] Foreign Application Priority Data

Oct. 27, 1987 [JP] Japan .................. 62-271105

[51] Int. Cl.⁵ ............................................. B60G 17/04
[52] U.S. Cl. ................................ 364/424.05; 280/707
[58] Field of Search .............. 364/424.05, 550, 551.01; 280/707, 6 R, 6 H, 714; 188/299

[56] References Cited

U.S. PATENT DOCUMENTS

| | | | |
|---|---|---|---|
| 4,483,546 | 11/1984 | Brearely .................. | 280/DIG. 1 X |
| 4,526,401 | 7/1985 | Kakizaki et al. ............... | 364/424.05 |
| 4,550,286 | 10/1985 | Holland et al. ..................... | 280/707 |
| 4,659,104 | 4/1987 | Tanaka et al. ..................... | 280/707 |
| 4,718,695 | 11/1988 | Kawagoe ........................... | 280/707 |
| 4,773,671 | 9/1988 | Inagaki .............................. | 188/299 |
| 4,787,650 | 11/1988 | Doi et al. ...................... | 364/424.05 |

Primary Examiner—Parshotam S. Lall
Assistant Examiner—V. N. Trans

[57] ABSTRACT

An actively controlled suspension system includes a fail-safe control system which detects abnormality of the output of a sensor to instantly perform fail-safe operation for ordering a neutral suspension mode with disabling the suspension control. The fail-safe system maintains the suspension system in the neutral mode for a predetermined period of time and performs checking of the output of the sensor after expiration of the predetermined period. The fail-safe system resumes suspension control when the sensor output as checked after expiration of the predetermined period is within a predetermined value range which is set about a known neutral position.

15 Claims, 8 Drawing Sheets

ACTIVELY CONTROLLED SUSPENSION SYSTEM WITH FAIL-SAFE OPERATION IN RESPONSE TO FAILURE OF SENSOR FOR MONITORING VEHICLE ATTITUDE CHANGE

BACKGROUND OF THE INVENTION

1. Field of the Invention

The present invention relates generally to an actively controlled suspension system for an automotive vehicle for actively controlling suspension characteristics according to vehicle driving conditions for achieving both of riding comfort and driving stability. More specifically, the invention relates to a fail-safe system of an actively controlled automotive suspension system which can perform fail-safe operation in response to failure in a sensor for monitoring the vehicular driving condition.

2. Description of the Background Art

Actively controlled suspensions have been developed and proposed in various constructions. In the recent days, such actively controlled suspension systems are known as good suspension systems for achieving both of riding comfort and vehicle driving stability. In general, such actively controlled suspension system performs anti-rolling suspension control, anti-pitching suspension control, bouncing suppressive suspension control, road shock absorbing suspension control and so forth. The suspension control system includes a plurality of sensor means for monitoring the vehicular driving condition. Since the suspension control for adjusting stiffness or suspension characteristics depending upon the suspension control parameters monitored by the sensor means, failure of the sensor means directly results in malfunctioning of the suspension control. Therefore, in case of failure of the sensor means which causes error in the monitored vehicular driving condition data, fail-safe operation has to be performed for controlling suspension system to predetermined suspension mode for assure safety.

In detection of failure of a sensor which monitors bounding and rebounding motion of the vehicular body in relation to a suspension member which rotatably supports a road wheel, a difficulty is encountered in discrimination of normal sensor condition and abnormal sensor condition. Namely, in the event that the vertical displacement monitoring sensor outputs a sensor signal representative of extraordinary magnitude of vertical displacement, discrimination whether such extraordinary value is caused by failure of the sensor or by vehicular driving condition, such as bottoming caused by passing over relatively large uneveness on the road, can not be made.

SUMMARY OF THE INVENTION

Therefore, it is an object of the present invention to provide an actively controlled suspension system which assures detection of failure of a sensor monitoring a vehicle driving condition and thus assures prevention of erroneous fail-safe operation.

In order to accomplish aforementioned and other objects, an actively controlled suspension system, according to the present invention, includes a fail-safe control system which detects abnormality of the output of a sensor to instantly perform fail-safe operation for ordering a neutral suspension mode with disabling the suspension control. The fail-safe system maintains the suspension system in the neutral mode for a predetermined period of time and performs checking of the output of the sensor after expiration of the predetermined period. The fail-safe system resumes suspension control when the sensor output as checked after expiration of the predetermined period is within a predetermined value range which is set about a known neutral position.

According to one aspect of the invention, an actively controlled suspension system comprises:

a cylinder disposed between a vehicle body and a suspension member which rotatably support a road wheel, and defining therein a working chamber filled with a pressure medium variable of pressure between a predetermined maximum pressure and a predetermined minimum pressure;

a pressure medium source circuit means connected to the working chamber, for supplying the pressure medium to the working chamber of the cylinder;

a pressure control valve means disposed within the pressure medium circuit means and variable of valve position between a first mode for increasing pressure of the pressure medium within the working chamber, a second mode for decreasing pressure in the pressure within the working source, and a third mode for maintaining the pressure in the pressure medium constant;

a sensor means for monitoring vehicle body attitude change for producing a vehicle body attitude change indicative sensor signal; and a controller means receiving the sensor signal for deriving a control signal for controlling the pressure control valve means in order to suppress attitude change in a normal mode operation, the controller means detecting abnormality of the sensor signal for switching operation mode from the normal mode to a fail-safe mode in which control signal is derived irrespective of the sensor signal and to adjust the pressure of the pressure medium within the working chamber at a predetermined pressure level between the maximum and minimum pressure, measuring an elapsed time from initiation of fail-safe mode operation and checking the condition of the sensor means after expiration of a predetermined period of time for resuming normal mode operation when normal sensor means condition is detected and maintaining the fail-safe mode operation otherwise.

According to another aspect of the invention, an actively controlled suspension system which is variable of suspension characteristics for performing bouncing suppressive control for suppressing vertical displacement between a vehicle body and a suspension member rotatably supporting a road wheel, comprises:

a cylinder disposed between the vehicle body and the suspension member, and defining therein a working chamber filled with a pressure medium variable of pressure between a predetermined maximum pressure and a predetermined minimum pressure;

a pressure medium source circuit means connected to the working chamber, for supplying the pressure medium to the working chamber of the cylinder;

a pressure control valve means disposed within the pressure medium circuit means and variable of valve position between a first mode for increasing pressure of the pressure medium within the working chamber, a second mode for decreasing pressure in the pressure within the working source, and a third mode for maintaining the pressure in the pressure medium constant;

a sensor means for monitoring relative vertical displacement between the vehicle body and the suspension member to produce a vertical displacement indicative sensor means; and a controller means receiving the sensor signal for deriving a control signal for controlling the pressure control valve means in order to suppress vertical displacement in a normal mode operation, the controller means detecting abnormality of the sensor signal value for switching operation mode from the normal mode to a fail-safe mode in which control signal is derived irrespective of the sensor signal and to adjust the pressure of the pressure medium within the working chamber at a predetermined pressure level between the maximum and minimum pressure, measuring an elapsed time from initiation of fail-safe mode operation and checking the condition of the sensor means after expiration of a predetermined period of time for resuming normal mode operation when normal sensor means condition is detected and maintaining the fail-safe mode operation otherwise.

The pressure of the pressure medium within the working pressure is initially set at an initial pressure substantially intermediate between the maximum and minimum pressures, and the controller means operates, in the fail-safe mode operation, to adjust the pressure of the pressure medium within the working chamber toward the initial pressure.

The controller means derives the control signal value on the basis of the sensor signal in the fail-safe mode operation and checks the most recently derived control signal value upon expiration of the predetermined period against a predetermined control signal value range set with respect to an initial control signal value ordering the initial pressure of the pressure medium within the working chamber to make judgement that the sensor means operates in normal condition when the control signal value is within the predetermined control valve range and make judgement that the sensor means fails when the control signal value is out of the predetermined control value range.

The sensor means monitors a vertical acceleration exerted on the vehicle body to produce a vertical acceleration indicative signal, and the controller means derives a vertical stroke speed data representative of vertical motion speed of the vehicle body relative to the suspension member on the basis of the vertical acceleration indicative signal, and the controller means initiates the fail-safe mode operation in response to the vertical acceleration indicative signal value greater than a normal acceleration criterion. The controller means derives the control signal value on the basis of the vertical motion speed in normal mode operation and derives the control signal value on the basis of the vertical stroke speed data in the fail-safe mode operation and checks the most recently derived control signal value upon expiration of the predetermined period against a predetermined control signal value range set with respect to an initial control signal value ordering a predetermined initial pressure of the pressure medium within the working chamber to make judgement that the sensor means operates in normal condition when the control signal value is within the predetermined control valve range and make judgement that the sensor means fails when the control signal value is out of the predetermined control value range.

DESCRIPTION OF THE PREFERRED EMBODIMENT

Figure 1:
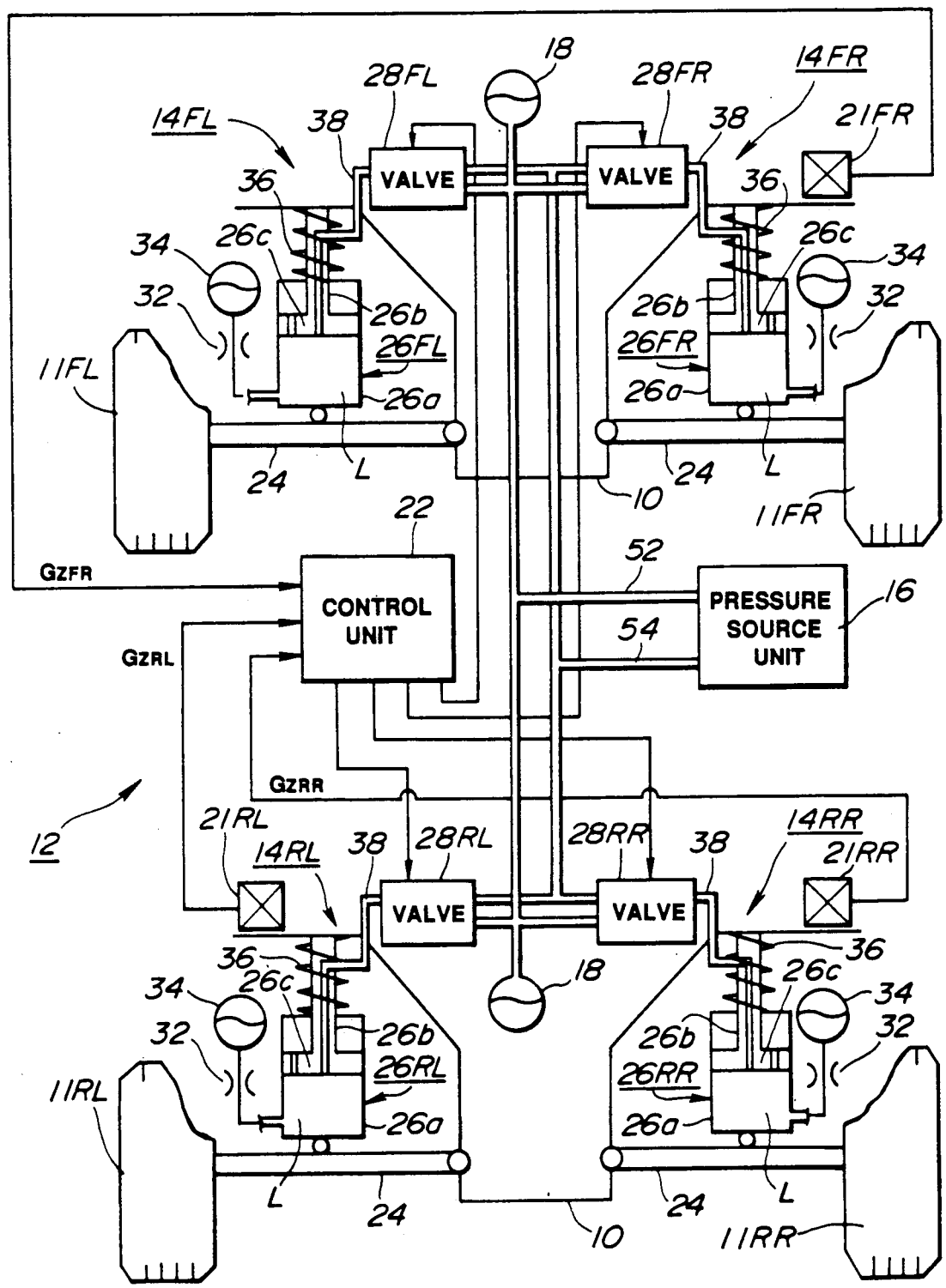
FIG. 1 is an illustration of the overall construction of the preferred embodiment of an actively controlled suspension system according to the present invention, in which preferred process of fail-detection and fail-safe operation is to be implemented.

Referring now to the drawings, particularly to FIG. 1, the preferred embodiment of an actively controlled suspension system, according to the present invention, is designed to generally perform suspension control for suppressing relative displacement between a vehicle body 10 and suspension members 24FL, 24FR, 24RL and 24RR provided in front-left, front-right, rear-left and rear-right suspension mechanisms 14FL, 14FR, 14RL and 14RR and rotatably supporting front-left, front-right, rear-left and rear-right wheels 11FL, 11FR, 11RL and 11RR, which suspension member will be represented by the reference numeral "24" as generally referred to, and suspension mechanisms will be represented by the reference numeral "14" as generally referred to, and whereby suppressing vehicle body attitude change. Respective front-left, front-right, rear-left and rear-right suspension mechanisms 14FL, 14FR, 14RL and 14RR include hydraulic cylinders 26FL, 26FR, 26RL and 26RR, which hydraulic cylinder will be hereafter represented by the reference numeral "26" as generally referred to.

Each of the hydraulic cylinder 26 is disposed between the vehicle body 10 and the suspension member 24 to produce a damping force for suppressing relative displacement between the vehicle body and the suspension member. The hydraulic cylinder 26 has a cylinder body 26a. The cylinder body 26a defines a working fluid chamber therein. A piston 26c is disposed within the working fluid chamber to divide the working fluid chamber into a lower working chamber 26d and an upper reference pressure chamber 26e. As will be seen from FIG. 1, the working chamber 26d and the reference pressure chamber 26e are communicated each other via an orifice 26f defined through the piston 26c. The piston 26c is connected to the vehicle body 10 via a piston rod 26b. A suspension coil spring 36 is wound around the piston rod 26b.

The working chamber 26d of each hydraulic cylinder 26 is connected to a hydraulic pressure source unit 16 via a pressure supply line 52, a pressure drain line 54, a pressure control valve unit 28FL, 28FR, 28RL and 28RR which will be hereafter represented by the reference numeral "28" as generally referred to, and a pressure line 38. As seen from FIGS. 1 through 3, the pressure line 38 is connected to a fluid path 26g defined through the piston rod 26b and the piston 26c. The working chamber 26d of the hydraulic cylinder 26 is further communicated with a pressure accumulator 34 via an orifice 32. Another pressure accumulators 18 are provided in the pressure supply line 52 for accumulating the excessive pressure generated by the pressure source unit 16.

The pressure control valve unit 28 comprises a proportioning valve and is designed to be controlled by an electric control signal for varying valve position according to variation of current value of the control signal. Generally, the pressure control valve unit 28 controls magnitude of introduction and draining of the pressurized working fluid into and from the working chamber 26d for adjusting the pressure in the working chamber for setting the damping mode of the hydraulic cylinder 26. To control the valve position of the pressure control valve unit 28, a control unit 22 which comprises a microprocessor, is provided.

The control unit 22 is connected to vertical acceleration sensors 21FR, 21RL and 21RR which monitor vertical accelerations exerted to the vehicle body at the portion of the front-right, rear-left and rear-right suspensions 14FR, 14RL and 14RR to produce vertical acceleration indicative signals GZFR, GZRL and GZRR. The vertical acceleration sensor will be hereafter represented by the reference numeral "21" as generally referred to. Similarly, the vertical acceleration indicative signal as generally referred to will be hereafter labeled as "Gz". In the shown embodiment, the vertical acceleration to be exerted on the vehicle body 10 at the portion of the front-left suspension 14FL is arithmetically derived on the basis of the vertical acceleration indicative signals GZFR, GZRL and GZRR.

Though the shown embodiment employs three vertical acceleration sensors 21FR, 21RL and 21RR for monitoring vertical accelerations exerted to the vehicle body at the portion of the front-right, rear-left and rear-right suspensions 14FR, 14RL and 14RR, it is, of course possible to provide additional vertical acceleration sensor for monitoring the vertical acceleration to be exerted on the vehicle body at the portion of the front-left suspension 14FL.

Figure 2:
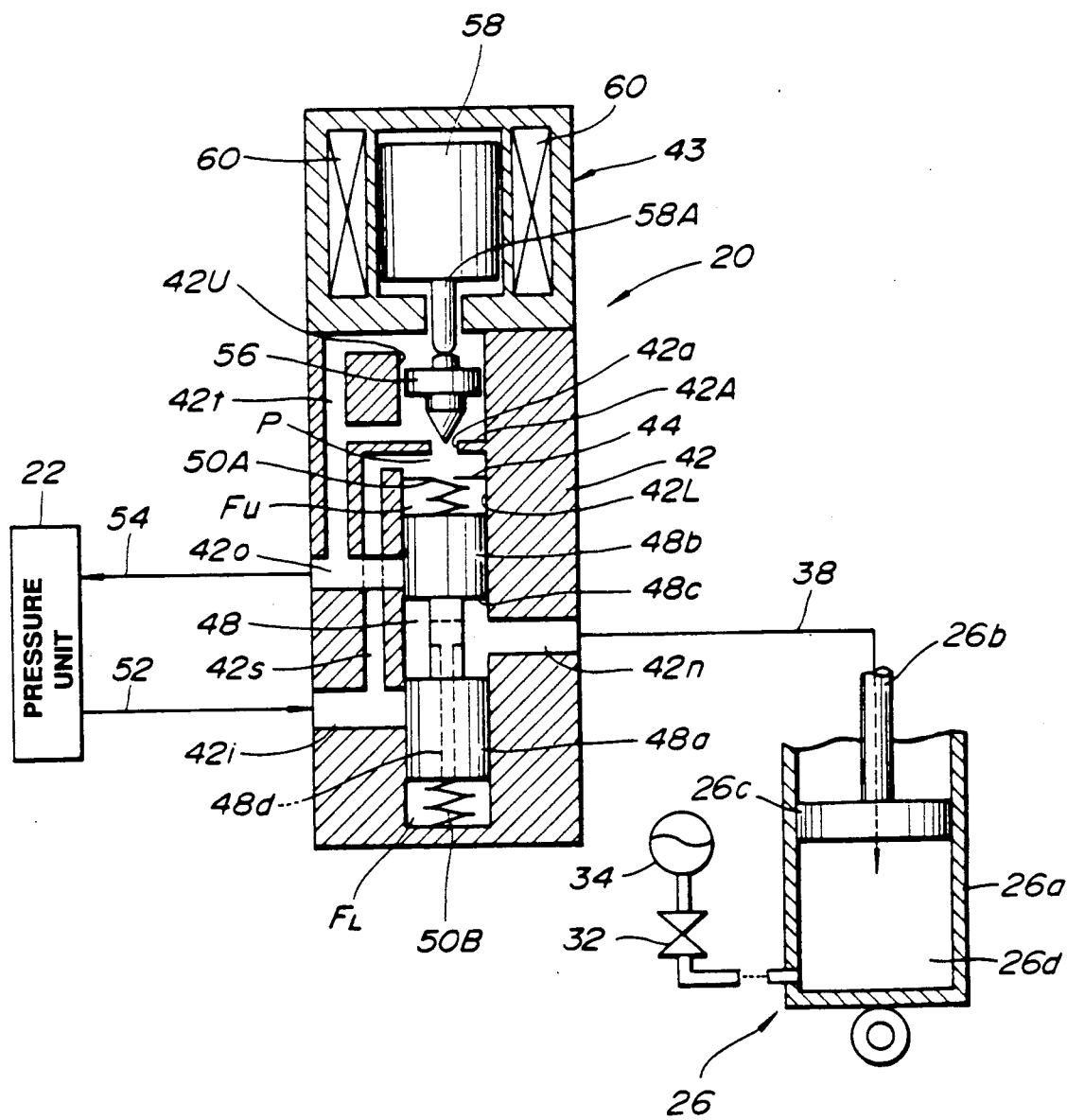
FIG. 2 is a sectional view of a pressure control valve employed in the preferred embodiment of the actively controlled suspension system of FIG. 1.

FIG. 2 shows the detailed construction of the pressure control valve unit 28 to be employed in the shown embodiment of the actively controlled suspension system set forth above.

The pressure control valve 28 comprises a valve housing 42 which housing a proportioning solenoid 43. The proportioning solenoid 43 is electrically connected to the control unit 22. The valve housing 42 defines a valve bore which is separated into a valve chamber 42L and a control chamber 42U by means of a partitioning member 42A. The partitioning member 42A is formed with a communication hole 42a. Above the communication hole 42a is defined the control chamber 42U. The valve chamber 42L and the control chamber 42U are aligned to each other across the communication hole 42a. Beneath the communication hole 42a and adjacent the top of the valve chamber 42L, a stationary throttling orifice defining member 44 is provided. The throttling orifice defining member 44 is formed with a fixed throttling rate of orifice. The throttling orifice defining member 44 defines with the partitioning member 42A a pilot chamber P.

A valve spool 48 is thrustingly or slidingly disposed within the valve chamber 42L. The valve spool 48 defines an upper feedback chamber FU between the top end thereof and the throttling orifice defining member 44. The valve spool 48 also defines a lower feedback chamber FL between the lower end thereof and the bottom of the valve chamber 42L. Offset springs 50A and 50B are disposed within the upper and lower feedback chambers FU and FL, which offset springs exerts spring force to the valve spool 48 for resiliently restricting movement of the latter. The valve chamber 42L is communicated with an inlet port 42i, a drain port 42o and the communication port 42n which are defined through to the pressure unit 16 via a supply line 52. On the other hand, the drain port 42o is connected to the pressure unit 16 via the drain line 54.

The valve spool 48 is formed with an upper land 48b and a lower land 48a. The upper and lower lands 48b and 48a defines therebetween an annular pressure chamber 48c. The valve spool 48 is formed with a pilot path communicating the pressure chamber 48c with the lower feedback chamber FL.

A poppet valve member 56 is disposed within the control chamber 42U for thrusting or sliding movement therein. The poppet valve member 56 has a valve head opposing to the communication hole 42a. The poppet valve member 56 is operably associated with the proportioning solenoid 43 which comprises a plunger 58 which has a plunger rod 58A. The lower end of the plunger rod 58A of the plunger 58 opposes to the top end of the poppet valve 56. The poppet valve member 56 is driven by the plunger 58 to control the path area in the communication hole 42a according to the position of the plunger rod 58A. Therefore, the poppet valve member 56 adjusts the path area of the communication hole 42a and whereby to control fluid pressure to be introduced in the pilot chamber P. poppet valve member 56 separates the control chamber 42U into upper and lower control chambers. In order to control the position of the poppet valve 56 for adjusting the pilot pressure in the pilot chamber P, a solenoid coil 60 is provided for energizing the deenergizing to cause axial shift of the plunger rod 58A.

By adjusting the fluid pressure in the pilot chamber P, the pressure in the upper feedback chamber FU is adjusted to exert an axially driving force to the valve spool 48 to cause axial shift. By this, selective fluid communication between the inlet port 42i, the drain port 42o and the communication port 42n can be established to adjust the fluid pressure at the communication port 42n. Since the pressure at the communication port 42n is equal to the fluid pressure in the woking chamber 26d of the pressure cylinder 26, the damping force created by the pressure cylinder can be adjusted. The inlet port 42*i* is also connected to the pilot chamber P via a fluid path 42*s*. On the other hand, the drain port 42*o* is connected to control chamber 42U via a fluid path 42*t*.

In order to control the pressure at the communication port 42*n*, a control current I is applied to the solenoid coil 60.

Figure 3:
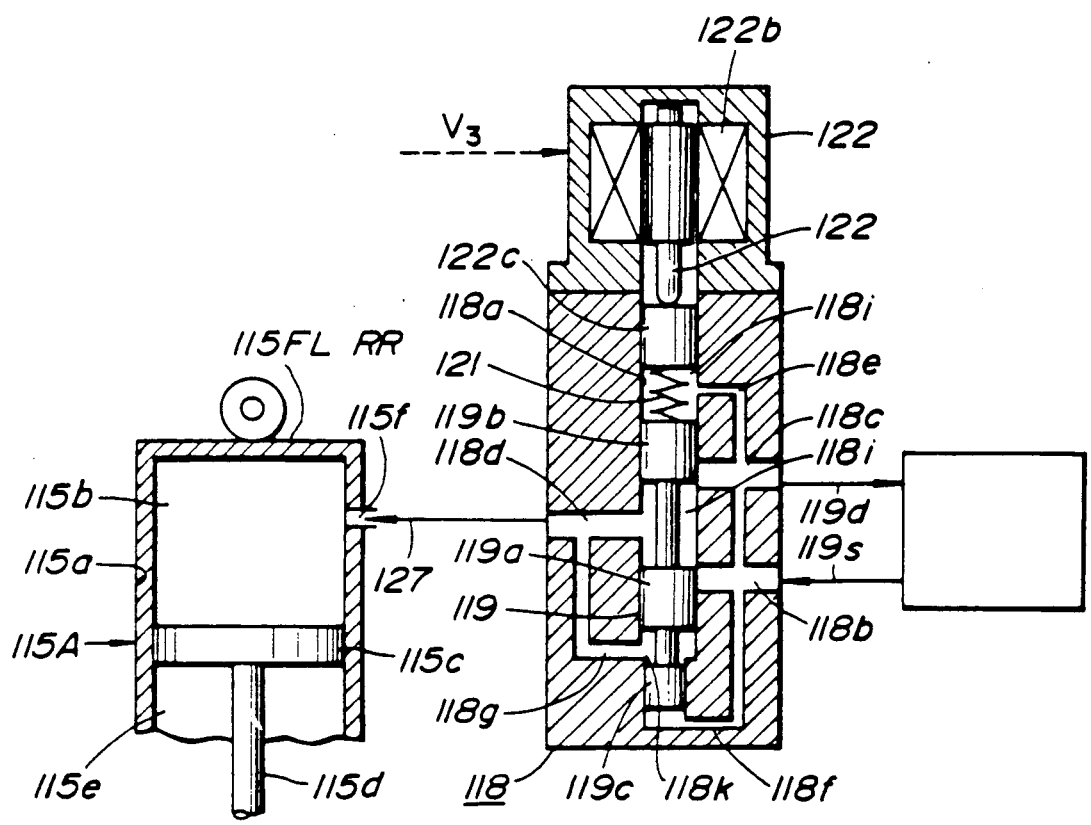
FIG. 3 is another embodiment of the pressure control valve to be employed in the preferred embodiment of the actively controlled suspension system of FIG. 1

FIG. 3 shows alternative embodiment of the pressure control valve unit 28 to be employed in the preferred embodiment of the actively controlled suspension system, according to the invention.

FIG. 3 shows the detailed construction of the hydraulic cylinder 115A and the pressure control valve 22. As will be seen from FIG. 3, the hollow cylinder housing 115*a* is formed with a port 115*f* communicating the upper fluid chamber 15*d* to an outlet port 118*d* of the pressure control valve 22 via a communication line 127. Though FIG. 3 does not show clear construction, the lower fluid chamber 115*e* is defined as an enclosed space and is filled with the viscous working fluid. The pressure of the working fluid in the lower fluid chamber 115*e* at an initial position of the piston 115*c* serves as a reference pressure and per se serves as resistance for downward movement of the piston.

The pressure control valve 22 has a valve housing 18A having the aforementioned outlet port 118*d*, an inlet port 118*b* and a drain port 118*c*. Respective inlet port 118*b*, the drain port 118*c* and the outlet port 118*d* are connected to a valve bore 118*a* defined within the valve housing 118A. A valve spool 119 is disposed within the valve bore 118*a* for thrusting movement therein. The valve spool 119 has first, second and third lands 119*a*, 119*b* and 119*c*. As will be seen from FIG. 3, the third land 19*c* has smaller diameter than that of the first and second lands 119*a* and 119*b*. The third land 119*c* defines a fifth pressure control chamber 118*h* which is connected to the drain port 118*c* via a drain path 118*f*. An actuator piston 122*c* is also disposed within the valve bore 118*a*. The actuator piston 122*c* opposes the second land 119*b* in spaced apart relationship to define a second pressure control chamber 118*i* which is connected to the drain port 118*c* via a drain path 118*e*. An annular pressure chamber 118*j* is defined between the first and second lands 119*a* and 119*b*. The pressure chamber 118*j* is constantly communicated with the outlet port 118*d* and whereby communicated with the upper fluid chamber 115*d*. On the other hand, the pressure chamber 118*j* shifts according to shifting of the valve spool 119 to selectively communicate with the inlet port 118*b* and the drain port 118*c*. On the other hand, an pressure control chamber 118*k* is defined between the first and third lands 119*a* and 119*c*. The pressure control chamber 118*k* is in communication with the outlet port 118*d* via a pilot path 118*g*. A bias spring 122*d* is interposed between the actuator piston 122*c* and the valve spool 119. The actuator piston 122*c* contacts with an actuator rod 122*a* of an electrically operable actuator 122 which comprises an electromagnetic solenoid. The solenoid 122 comprises a proportioning solenoid.

In order to increase the supply pressure of the working fluid, the spool valve 119 is shifted to the position to increase path area at a throttle constituted at the inner end of the inlet port 118*b* by means of the land 119*a* of the spool valve 119. On the other hand, in order to decrease the supply pressure of the working fluid, the spool valve is shifted to the position to decrease the path area at the throttle of the inner end of the inlet port 118*b* and opens the drain port 118 which is normally blocked by means of the land 119*b* of the spool valve.

As seen from FIG. 3, the proportioning solenoid 122 comprises the actuator rod 122*a* and a solenoid coil 122*b*. The solenoid coil 122*b* is energized by suspension control signal from the control unit. In the shown embodiment of the pressure control valve, the working fluid pressure P at the outlet port 118*d* is variable according to the predetermined variation characteristics Namely, when the control value represented by the suspension control signal is zero, the pressure at the outlet port 118 becomes an initial pressure determined according to a predetermined offset pressure. When the suspension control signal value in positive value increases, the fluid pressure at the outlet port 118*d* increases with a predetermined proportioning rate. Namely, by increasing of the suspension control value, the actuator rod 122*a* is driven downwardly in FIG. 3 at a magnitude toward to position to achieve increasing of the fluid pressure with the predetermined proportioning rate. The fluid pressure at the outlet port 118*d* saturate at the output pressure of the pressure unit. On the other hand, when the suspension control signal value decreases, the pressure decreases to zero to by shifting of the actuator rod 122*a*.

The actuator rod 122*a* of the proportioning solenoid 122 is associated with the actuator piston 122*c*. Contact between the actuation rod 122*a* and the actuator piston 122*c* can be maintained by the resilient force of the bias spring 122*d* which normally biases the actuator piston toward the actuation rod. On the other hand, the spring force of the bias spring 122*d* is also exerted on the valve spool 119 to constantly bias the valve spool downwardly in FIG. 3. The valve spool 119 also receives upward hydraulic force from the pressure control chamber 118*k*. Therefore, the valve spool 119 is oriented at the position in the valve bore at the position where the downward bias of the bias spring 122*d* balances with the upward hydraulic force of the pressure control chamber 118*k*.

Figure 4:
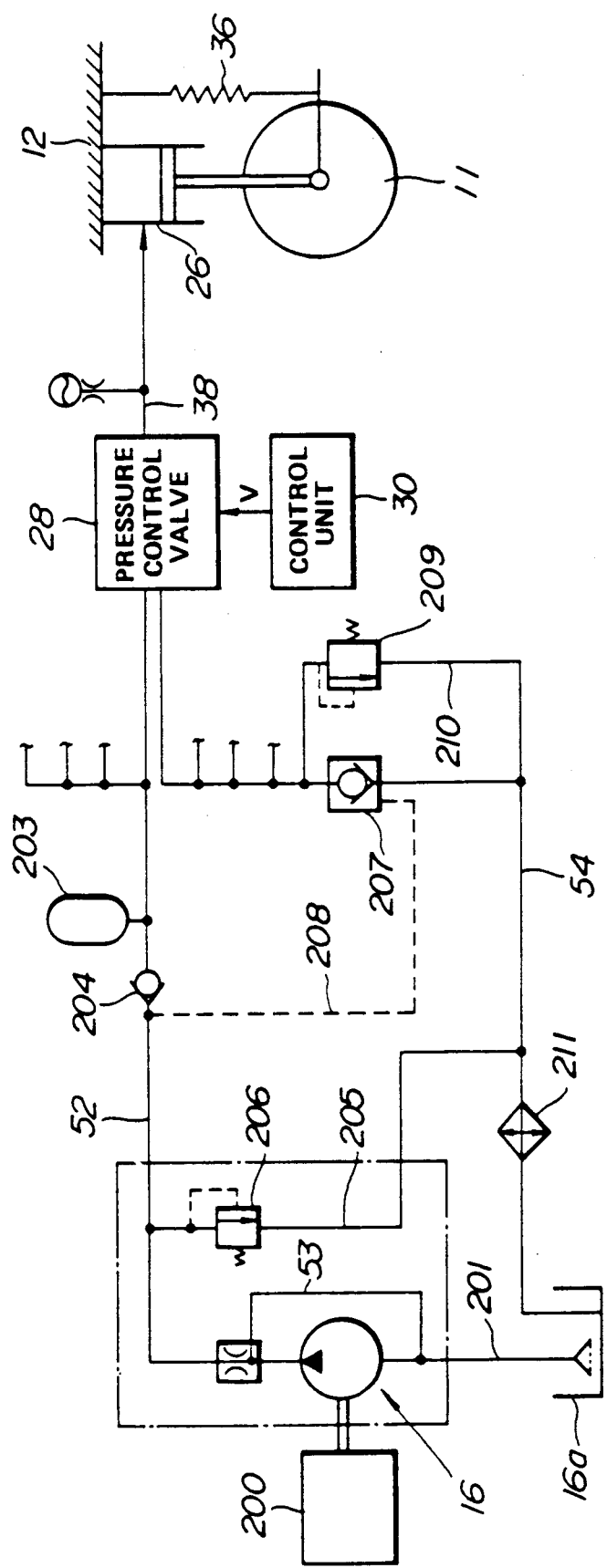
FIG. 4 is a circuit diagram of a hydraulic circuit to be employed in the preferred embodiment of the actively controlled suspension system according to the present invention.

FIG. 4 is a circuit diagram of a hydraulic circuit including the pressure source unit 16 and the working fluid chamber 26*d* of the hydraulic cylinder 26.

FIG. 4 shows detailed circuit construction of the preferred embodiment of the hydraulic system to be employed in the suspension control system according to the invention. As set forth, the pressure source unit includes the pressure unit 16 which comprises a fluid pump, and is connected to the reservoir 16*a* via a suction pipe 201 which is driven by means of an automotive engine 200. The outlet of the pressure unit 16, through which the pressurized working fluid is fed, is connected to the inlet port 42*i* of the pressure control valve 18 via the supply line 52. A pressure regulating orifice 202 is disposed in the supply line 52 for suppressing pulsatile flow of the working fluid and whereby regulate the output pressure of the pressure unit 16 to be delivered to the pressure control valve 28. A feedback line 53 is connected to the upstream of the pressure regulating orifice 202 at one end. The other end of the feedback line 53 is connected to the upstream of the inlet of the pressure unit 16. Therefore, excessive fluid between the pressure unit 16 and the orifice 202 is fed back to the inlet side of the pressure unit.

A pressure accumulator 203 is also connected to the supply line 52 to receive therefrom the pressurized fluid for accumulating the pressure. An one-way check valve 204 is disposed in the supply line 52 at the position upstream of the junction between the pressure accumulator 203 and the supply line 52.

A pressure relief line 205 is also connected to the supply line 52 at the position intermediate between the pressure regulating orifice 202 and the one-way check valve 204, at one end. The other end of the pressure relief line 205 is connected to the drain line 54. A pressure relief valve 206 is disposed in the pressure relief line 205. The pressure relief valve 206 is responsive to the fluid pressure in the supply line 52 higher than a give value to drain part of the working fluid to the drain line for maintaining the pressure in the supply line 52 below the given pressure value.

On the other hand, a shut-off valve 207 is disposed in the drain line 54. The shut-off valve 207 is also connected to the supply line 52 at upstream of the one-way check valve 204 to receive therefrom the pressure in the supply line as a pilot pressure, via pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 54 may flow therethrough to the reservoir tank 16a. On the other hand, the shut-off valve 207 is responsive to the pilot pressure drops below the given pressure level to be switched into shut-off position. At the shut-off position, the shut-off valve blocks fluid communication between the drain port 42o and the reservoir tank 16a.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 54 upstream thereof, higher than a set pressure, e.g. 30 kgf/cm$^2$, in order to establish fluid communication between the upstream side and downstream side of the shut-off valve to allow the excessive pressure at the upstream side drain line 54 to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 54 for cooling the working fluid returning to the reservoir tank 16a.

Pressurized fluid supply operation to be taken place by the pressure source unit as set forth above will be discussed herebelow.

While the automotive engine 200 is running, the fluid pump as the pressure unit 16 is driven. Therefore, the working fluid in the reservoir tank 16a is sucked via the suction pipe 201 and pressurized through the pressure unit 16. The pressurized working fluid is discharged from the outlet of the pressure unit 16 and fed to the pressure control valve 28 via the supply line 54 including the pressure regulating orifice 202 and the one-way check valve 204. When the pressure control valve 28 in a position of FIG. 2, the pressurized working fluid passes the pressure control valve and introduced into the working chamber 26d of the hydraulic cylinder 26. On the other hand, when the pressure control valve 28 is shifted to block communication between the supply line 52 and the working chamber 26d, the line pressure in the supply line increases. When the line pressure in the supply line 52 becomes higher than a set pressure of the pressure relief valve 206 in the pressure relief line 205, the excessive pressure higher than the set pressure is fed to the drain line 54 via the pressure relief valve 206 and thus returned to the reservoir tank 16a.

The fluid pressure in the supply line 52 is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 28 and the reservoir tank 16a is maintained. At this position, the working fluid is thus returned to the reservoir tank 16a via the drain line 54 via the shut-off valve 207 and the oil cooler 211.

Since the shut-off valve 207, even at the open position, serves as a resistance to the fluid flow. Therefore, the fluid pressure in the drain line 54 upstream of the shut-off valve 207 becomes excessively higher, i.e. higher than the off-set pressure $P_0$. Then, the pressure relief valve 209 becomes active to open for allowing the excessive pressure of the working fluid to flow through the by-pass line 210.

When the engine 200 stops, the pressure unit 16 cease operation. By stopping of the pressure unit 16, the working fluid pressure in the supply line 52 drops. According to drop of the pressure in the supply line 52, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 54 upstream of the shut-off valve 207 becomes equal to the pressure in the working chamber 26d. Therefore, even when the working fluid leaks through a gap between the spool valve 48 and the inner periphery of the valve bore, it will not affect the fluid pressure in the working chamber 26d.

This is advantageous to maintain the suspension characteristics of the suspension systems irrespective of the engine driving condition.

Figure 5:
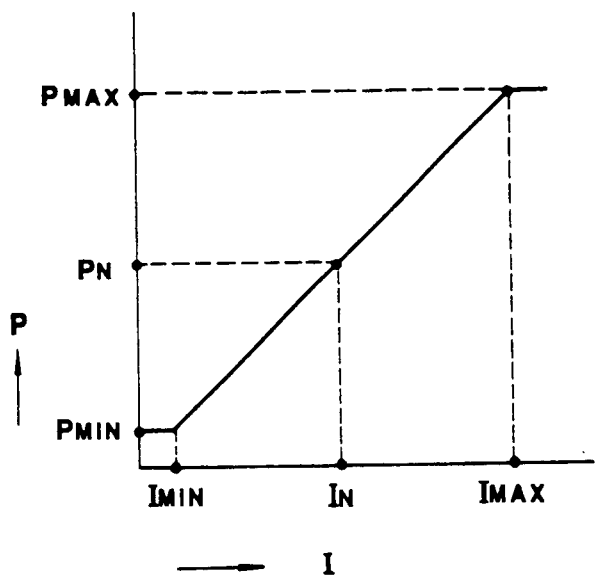
FIG. 5 is a chart showing relationship between an electric current value of a control signal to be output by a control unit and a hydraulic pressure in a pressure chamber of a hydraulic cylinder.
Figure 6:
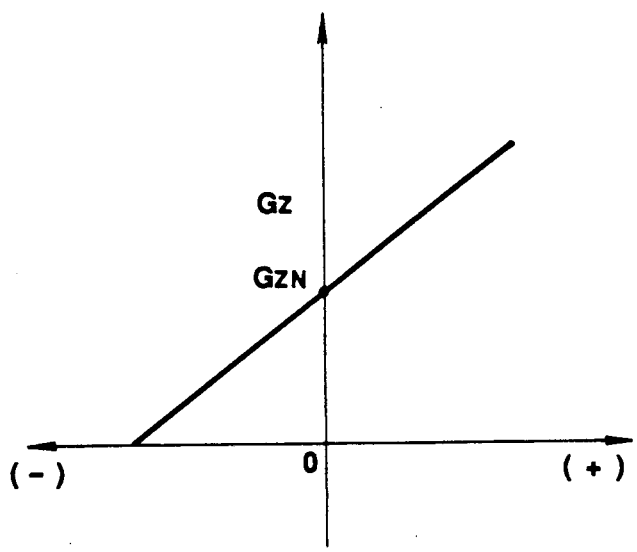
FIG. 6 is a chart showing variation of a vertical acceleration indicative sensor signal in relation to a magnitude of vertical acceleration exerted on a vehicular body.
Figure 7:
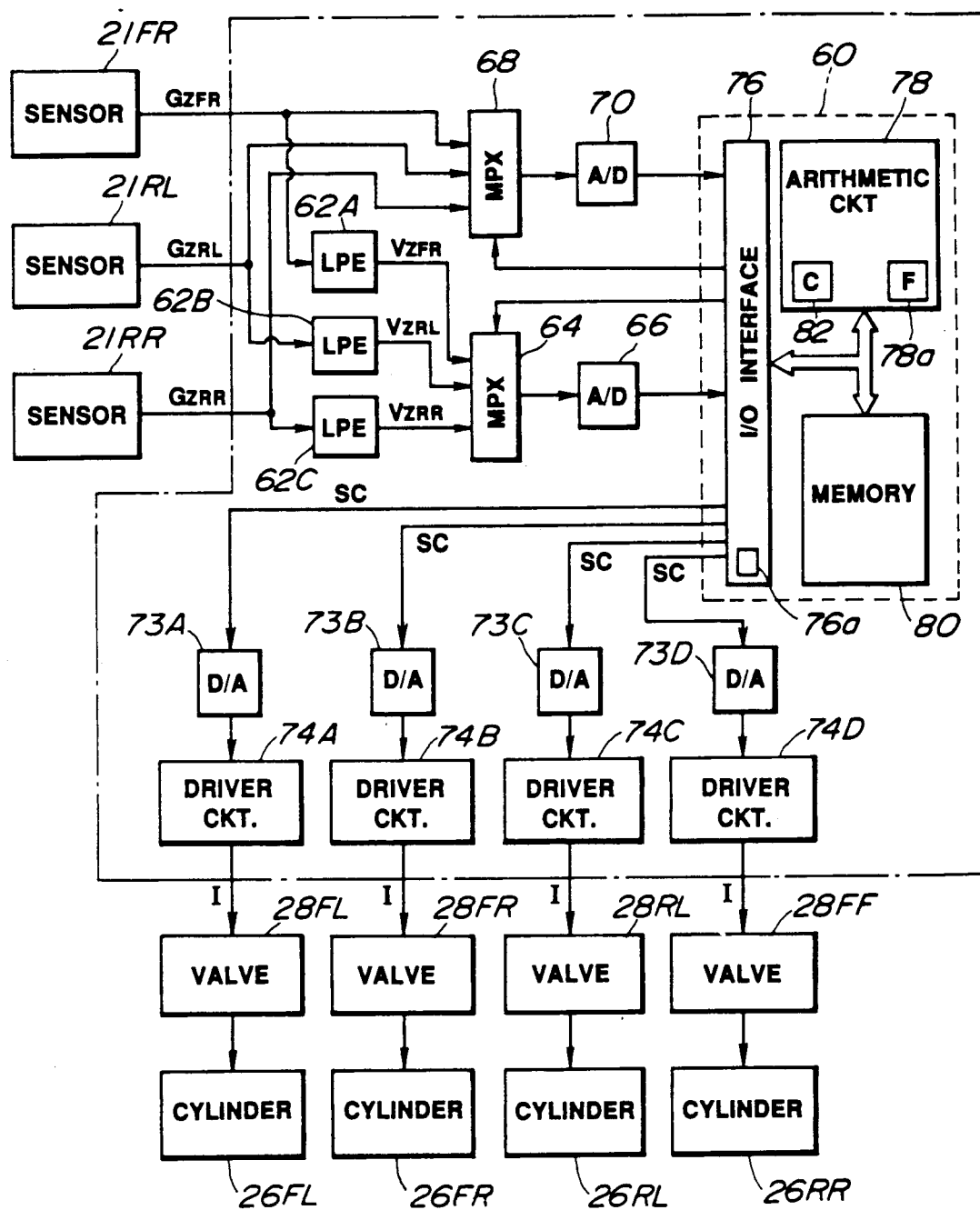
FIG. 7 is a schematic block diagram showing an electric circuit including a control unit, of the preferred embodiment of the actively controlled suspension system of FIG. 1.
Figure 8:
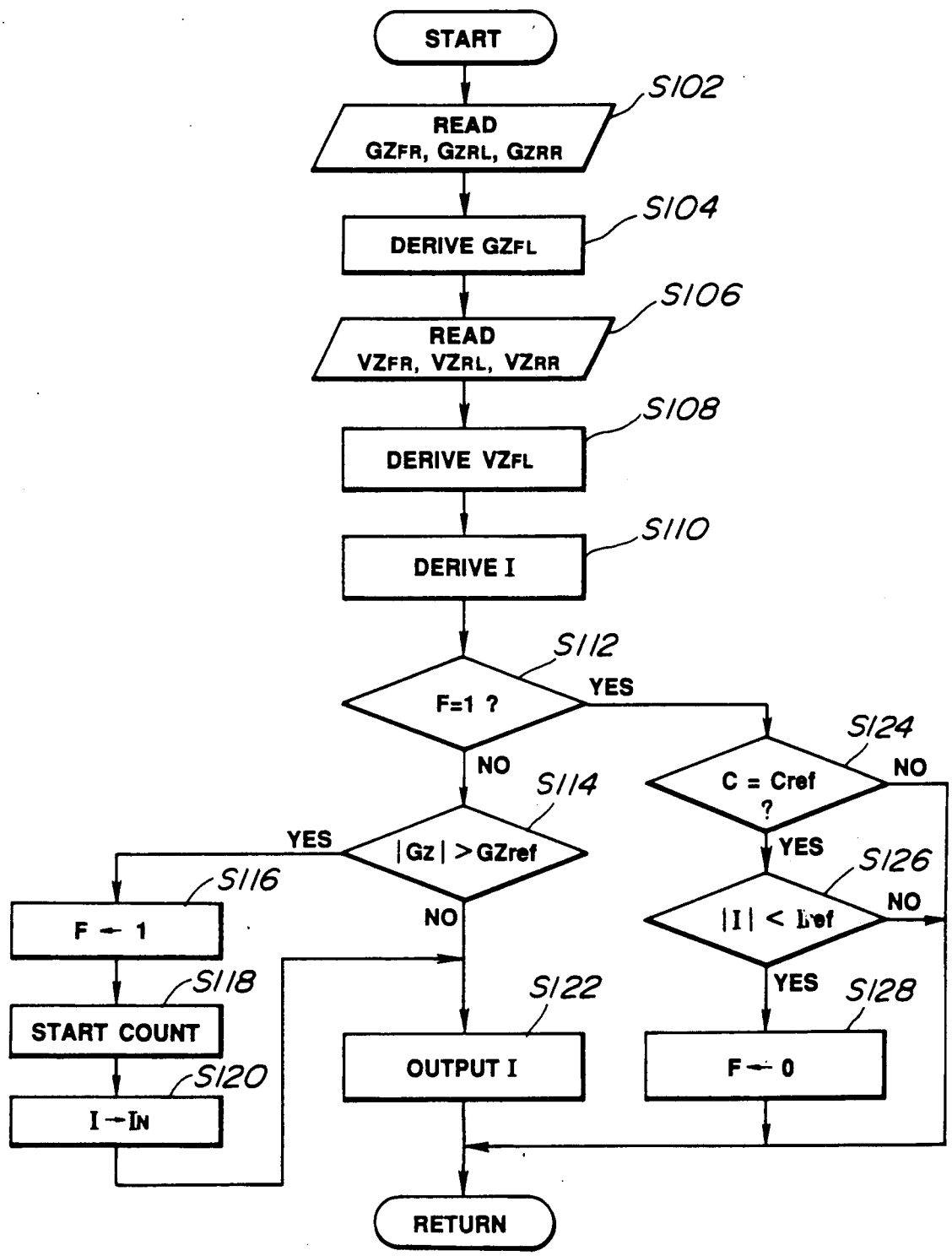
FIG. 8 is a flowchart of a suspension control program which is designed to perform active control of the suspension characteristics and also to perform fail-safe mode control.

As seen from FIG. 5, the working fluid pressure in the working chamber 26d of the hydraulic cylinder 26 varies according to variation of the current value of the control signal applied to the pressure control valve unit 28. As seen from FIG. 5, hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 5, the maximum hydraulic pressure $P_{max}$ corresponds to the maximum current value $I_{max}$ of the control signal and the minimum hydraulic pressure $P_{min}$ corresponds to the minimum current value $I_{min}$ of the control signal. Furthermore, the hydraulic pressure level as labeled $P_n$ represents neutral pressure at the neutral current $I_n$. As seen, the neutral current value $I_n$ is set at an intermediate value between the maximum current value $I_{max}$ and the minimum current value $I_{min}$.

On the other hand, the vertical acceleration indicative signals GZFR, GZRL and GZRR output by the vertical acceleration sensors 21FR, 21RL and 21RR varies linearly according to variation of the vertical accelerations respectively exerted on the vehicle body 10 at the front-right, rear-left and rear-right suspensions $$I = VZ \times Kz$$

where VZ is VZFL, VZFR, VZRL and VZRR; and
Kz is a predetermined constant.

After deriving the control current value I, a faulty indicative flag F which is set and reset in a flag register 78a in the arithmetic circuit 78 is checked at a step S112.

When the faulty indicative flag F is not set as checked at the step S112, the absolute value of the vertical acceleration data GZ (GZFL, GZFR, GZRL and GZRR) are compared with an acceleration threshold $GZ_{ref}$ at a step S114. The step S114 is provided for detecting the extraordinally great value of vertical acceleration caused due to failure of the vertical acceleration sensor or due to passing over relatively large step or projection on the road. Therefore, the acceleration threshold $GZ_{ref}$ is set at relatively great value, e.g. 0.8 G.

When the absolute value of the vertical acceleration data GZ is greater than the acceleration threshold $GZ_{ref}$ as checked at the step S114, the faulty indicative flag F is set at a step S116. After setting the faulty indicative flag F at the step S116, a loop counter 82 is triggered at a step S118 for starting measurement of an elapsed period from detection of the faulty condition of the vertical acceleration sensor 21. Then, the control current value I derived at the step S110 is replaced with the neutral current value $I_n$ at a step S120. Thereafter, the control signal SC corresponding to the control current value I is derived and output at a step S122. On the other hand, when the absolute value of the vertical acceleration indicative data GZ as checked at the step S114 is smaller than or equal to the acceleration threshold $GZ_{ref}$, the process jumps to the step S122 to derive the control signal value SC to the value corresponding to the control current value I derived at the step S112 and output the control signal. After outputting the control signal SC at the step S122 process goes END.

On the other hand, when the faulty indicative flag F is set as checked at the step S112, a loop counter value C of the loop counter 82 is read and compared with a loop counter reference value $C_{ref}$ at a step S124. The loop counter reference value $C_{ref}$ is set in view of the required time for adjusting the hydraulic pressure P in the working chamber 26d from the pressure close to the maximum or minimum pressure to the neutral pressure $P_n$ and required time for stabilizing of the control current value I which tends to fluctuate due to fluctuation of the acceleration indicative data. In the shown example, the loop counter reference value $C_{ref}$ is set at a value corresponding to a period of 500 ms.

As long as the loop counter value C is maintained smaller than the loop counter reference value $C_{ref}$, process directly goes END. Therefore, the neutral current value $I_n$ indicative control signal SC is continued.

When the loop counter value C becomes greater than or equal to the loop counter reference value $C_{ref}$ as checked at the step S124, the absolute value of the control current value I derived at the step S110 in the current execution cycle is read out and compared with a control current threshold value $I_{ref}$ at a step S126. The control current threshold value $I_{ref}$ is set at a value corresponding to or near the neutral current value $I_n$. Practically, the control current threshold value $I_{ref}$ is set at a value corresponding to 0.02 G.

When the absolute value of the control current value I as checked at the step S126 is smaller than the control current threshold value $I_{ref}$, the faulty indicative flag F is reset at a step S128. On the other hand, when the absolute value of the control current value I is greater than or equal to the control current threshold value $I_{ref}$, process directly goes END.

As will be seen from the discussion given hereabove, when the faulty of the vertical acceleration sensor is detected, fail-safe operation is performed instantly to adjust the hydraulic pressure in the working chamber 26d of the hydraulic cylinder 26 to the neutral pressure $P_n$. The temporary fail-safe operation is maintained for the given period, e.g. 500 ms. After expiration of the given period, check is once again performed for checking whether the control current value I is within a value range defined about the neutral current value $I_n$.

By adding the process of checking the abnormality after entry into fail-safe mode operation, normal mode suspension control can be resumed when abnormality of the vertical acceleration sensor is erroneously detected due to extraordinary variation of the vehicular height when vehicle passes over substantial height difference of step or projection. Namely, when the acceleration indicative data falls into the abnormal range due to substantial change of vehicular height because of bottoming of the suspension, the control current value subsequently varies toward the neutral current after the vehicle passes over the step or projection. Therefore, in the additional check timing, the control current value I has to be returned to the value close to the neutral current value $I_n$ when the extraordinary value of the vertical acceleration indicative data is caused due to vehicle driving condition.

Advantage of checking of the control current value I rather than the vertical acceleration indicative data GZ in the second checking is expected to avoid influence of a lag of variation of the control current relative to variation of the vertical acceleration. Namely, the control current I varies according to variation of the vertical acceleration with a certain lag time. If the judgement is made based on the vertical acceleration, normal mode suspension control is resumed to cause substantial change of the vehicular height.

Figure 9:
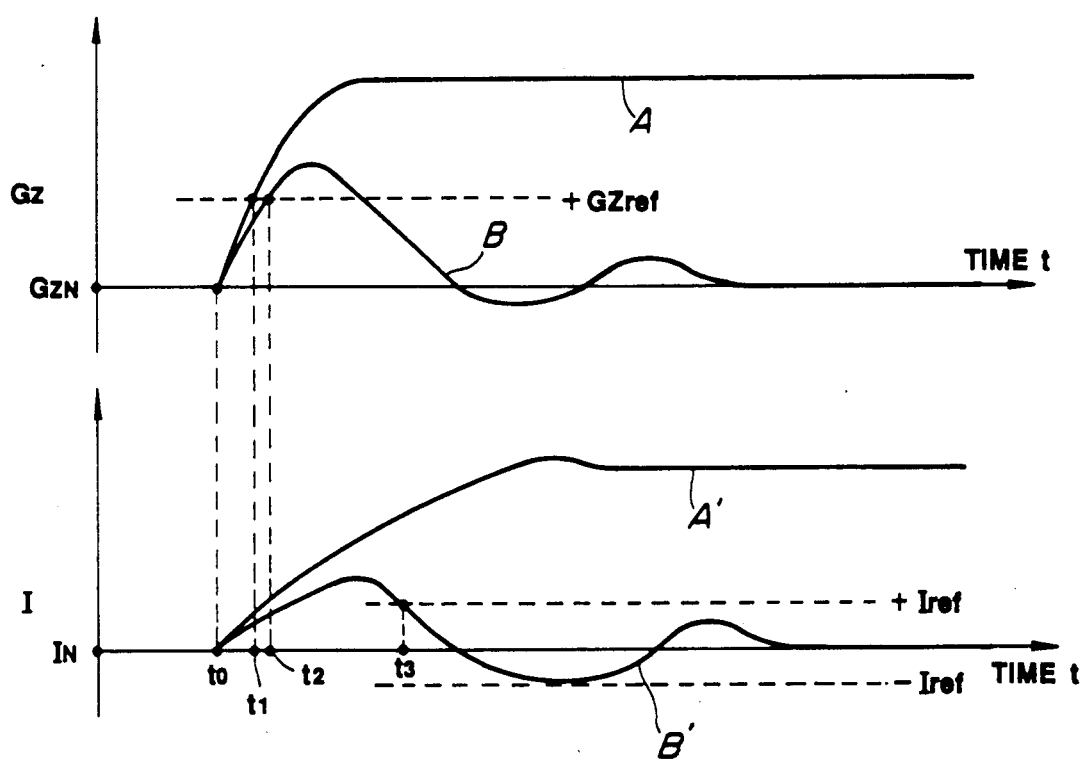
FIG. 9 is a timing chart showing operation to be performed by the actively controlled suspension system of FIG. 1.

FIG. 9 shows practical process of suspension control operation performed by the preferred embodiment of the suspension control system of FIG. 1. In FIG. 9, the lines A and B illustrate variation of the vertical acceleration indicative data GZ and lines A' and B' illustrate variation of control current I. The lines A and A' show variation of the vertical acceleration indicative data GZ and the control current I when the vertical acceleration sensor 21 fails. On the other hand, lines B and B' show variation of the vertical acceleration indicative data GZ and the control current I when the vertical acceleration indicative data temporarily becomes the extraordinary value due to substantial vehicular height variation cause by passing over substantial step on the road.

In the former case, the vertical acceleration indicative data GZ start to increase from a time $t_0$ and subsequently increases across the vertical acceleration threshold $GZ_{ref}$ at a time $t_1$, then judgement is made that the vertical acceleration sensor fails. Therefore, fail-safe operation is taken place at the time $t_1$. By this, the control current value I is fixed at the neutral current $I_n$.

Because the vertical acceleration sensor actually fails, the vertical acceleration indicative data GZ still increases toward to maximum saturating value and maintained at the saturating maximum value. By this, the control current value I derived based thereon is maintained at a greater value than the control current threshold $I_{ref}$ even after a given period.

By this, fail-safe operation is maintained to maintain the control current value at the neutral current value $I_n$.

On the other hand, in the latter case, the vertical acceleration data GZ temporarily increased across the vertical acceleration threshold $GZ_{ref}$ at a time $t_2$ and subsequently decreases across the vertical acceleration threshold. With a slight delay time, the control current value I decreases across a criterion defining the predetermined range about the neutral current $I_n$ at a time $t_3$. Therefore, after expiration of the given period, the control mode returns into the normal mode.

Therefore, influence of erroneous detection due to temporary variation of the vertical acceleration data due to substantial vehicular height variation can be minimized.

As will be appreciated herefrom, the present invention fulfills all of the objects and advantages sought therefor.

It should be appreciated that though the present invention is disclosed in detail in terms of the specific embodiment implementing the present invention, the invention is applicable for any types of suspension control systems. Therefore, the invention should be appreciated to include all of possible embodiments and modifications of the shown embodiment which can be implemented without departing from the principle of the invention which is set out in the appended claims.

What is claimed is:

1. An actively controlled suspension system comprising:
   a cylinder disposed between a vehicle body and a suspension member which rotatably supports a road wheel, and defining therein a working chamber filled with a pressure medium variable in pressure between a predetermined maximum pressure and a predetermined minimum pressure;
   a pressure medium source circuit means connected to said working chamber, for supplying said pressure medium to said working chamber of said cylinder;
   a pressure control valve means disposed within said pressure medium circuit means and variable in valve position between a first mode for increasing pressure of said pressure medium within said working chamber, a second mode for decreasing pressure of said pressure medium within said working chamber, and a third mode for maintaining said pressure of said pressure medium constant;
   a sensor means for monitoring vehicle body attitude changes for producing a vehicle body attitude change indicative sensor signal; and
   a controller means receiving said sensor signal for deriving a control signal for controlling said pressure control valve means in order to suppress attitude changes in a normal mode of operation, said controller means detecting an abnormality of said sensor signal for switching operation mode from said normal mode to a fail-safe mode in which said control signal is derived irrespective of said sensor signal to adjust the pressure of said pressure medium within said working chamber to a predetermined pressure level between said maximum and minimum pressures, measuring an elapsed time from initiation of said fail-safe mode of operation and checking the condition of said sensor means by comparing said sensor signal with a reference value substantially corresponding to said predetermined pressure level to detect a normal or an abnormal condition of said sensor means after expiration of a predetermined period of time for resuming said normal mode of operation when said normal sensor means condition is detected and maintaining said fail-safe mode of operation otherwise.

2. An actively controlled suspension system as set forth in claim 1, wherein the pressure of said pressure medium within said working pressure is initially set at an initial pressure substantially intermediate between said maximum and minimum pressure, and said controller means operates, in said fail-safe mode operation, to adjust the pressure of said pressure medium within said working chamber toward said initial pressure.

3. An actively controlled suspension system as set forth in claim 2, wherein said controller means derives the control signal on the basis of said sensor signal in said fail-safe mode operation and checks the most recently derived value of the control signal upon expiration of said predetermined period against a predetermined control signal value range set with respect to an initial control signal value ordering said initial pressure of the pressure medium within said working chamber to make a judgement that said sensor means operates in said normal condition when said value of said control signal is within said predetermined control value range and make a judgement that said sensor means fails when the value of said control signal is out of said predetermined control value range.

4. An actively controlled suspension system as set forth in claim 1, wherein said sensor means monitors vertical displacement of said vehicle body relative to said suspension member and said controller means performs bouncing suppressive suspension control.

5. An actively controlled suspension system as set forth in claim 4, wherein said sensor means monitors a vertical acceleration exerted on said vehicle body to produce a vertical acceleration indicative signal, and said controller mans derives a vertical stroke speed data representative of vertical motion speed of said vehicle body relative to said suspension member on the basis of said vertical acceleration indicative signal, and said controller means initiates said fail-safe mode operation in response to said vertical acceleration indicative signal value greater than a normal acceleration criterion.

6. An actively controlled suspension system as set forth in claim 5, wherein said controller means derives a value of said control signal on the basis of said vertical motion speed in normal mode operation and derives a value of the control signal on the basis of said vertical stroke speed data in said fail-safe mode operation and checks the most recently derived value of said control signal upon expiration of said predetermined period against a predetermined control signal value range set with respect to an initial control signal value ordering a predetermined initial pressure of the pressure medium within said working chamber to make a judgement that said sensor means operates in normal condition when the value of said control signal is within said predetermined control valve range and make a judgement that said sensor means fails when the value of said control signal is out of said predetermined control value range.

7. An actively controlled suspension system as set forth in claim 6, wherein the pressure of said pressure medium within said working pressure is initially set at an initial pressure substantially intermediate between said maximum and minimum pressures, and said controller mans operates, in said fail-safe mode operation, to adjust the pressure of said pressure medium within said working chamber toward said initial pressure.

8. An actively controlled suspension system as set forth in claim 1, wherein said sensor means monitors a vertical acceleration exerted on said vehicle body to produce a vertical acceleration indicative signal, and said controller means derives a vertical stroke speed data representative of vertical motion speed of said vehicle body relative to said suspension member on the basis of said vertical acceleration indicative signal, and said controller mans initiates said fail-safe mode operation in response to said vertical acceleration indicative signal value greater than a normal acceleration criterion.

9. An actively controlled suspension system as set forth in claim 8, wherein said controller means derives said control signal on the basis of said vertical motion speed in said normal mode of operation and derives the control signal on the basis of said vertical stroke speed data in said fail-safe mode of operation and checks the most recently derived value of said control signal upon expiration of said predetermined period against a predetermined control signal value range set with respect to an initial control signal value ordering a predetermined initial pressure of the pressure medium within said working chamber to make a judgement that said sensor means operates in said normal condition when the value of said control signal is within said predetermined control valve range and make a judgement that said sensor means fails when the value of said control signal is out of said predetermined control value range.

10. An actively controlled suspension system as set forth in claim 9, wherein the pressure of said pressure medium within said working pressure is initially set at an initial pressure substantially intermediate between said maximum and minimum pressures, and said controller means operates, in said fail-safe mode of operation, to adjust the pressure of said pressure medium within said working chamber toward said initial pressure.

11. An actively controlled suspension system which is variable in suspension characteristics for performing bouncing suppressive control for suppressing vertical member rotatably supporting a road wheel, comprising:
  a cylinder disposed between said vehicle body and said suspension member, and defining therein a working chamber filled with a pressure medium variable in pressure between a predetermined maximum pressure and a predetermined minimum pressure;
  a pressure medium source circuit means connected to said working chamber, for supplying said pressure medium to said working chamber of said cylinder;
  a pressure control valve means disposed within said pressure medium circuit means and variable in valve position between a first mode for increasing pressure of said pressure medium within said working chamber, a second mode for decreasing pressure of said pressure medium within said working chamber, and a third mode for maintaining said pressure of said pressure medium constant;
  a sensor means for monitoring relative vertical displacement between said vehicle body and said suspension member to produce a vertical displacement indicative sensor signal; and
  a controller means receiving said sensor signal for deriving a control signal for controlling said pressure control valve means in order to suppress vertical displacement in a normal mode of operation, said controller means detecting an abnormality of said sensor signal for switching operation mode from said normal mode to a fail-safe mode in which said control signal is derived irrespective of said sensor signal to adjust the pressure of said pressure medium within said working chamber to a predetermined pressure level between said maximum and minimum pressure, measuring an elapsed time for initiation of said fail-safe mode of operation and checking the condition of said sensor means by comparing said sensor signal with a reference value substantially corresponding to said predetermined pressure level to detect a normal or an abnormal condition of said sensor means after expiration of a predetermined period of time for resuming said normal mode of operation when said normal sensor means condition is detected and maintained said fail-safe mode of operation otherwise.

12. An actively controlled suspension system as set forth in claim 11, wherein the pressure of said pressure medium within said working pressure is initially set at an initial pressure substantially intermediate between said maximum and minimum pressures, and said controller means operates, in said fail-safe mode operation, to adjust the pressure of said pressure medium within said working chamber toward said initial pressure.

13. An actively controlled suspension system as set forth in claim 12, wherein said controller means derives the control signal on the basis of said sensor signal in said fail-safe mode operation and checks the most recently derived value of said control signal upon expiration of said predetermined period against a predetermined control signal value range set with respect to an initial control signal value ordering said initial pressure of the pressure medium within said working chamber to make a judgement that said sensor means operates in a normal condition when the value of said control signal is within aid predetermined control value range and make a judgement that said sensor means fails when the value of said control signal is out of said predetermined control value range.

14. An actively controlled suspension system comprising:
  a cylinder disposed between a vehicle body and a suspension member which rotatably supports a road wheel, and defining therein a working chamber filled with a pressure medium variable in pressure between a predetermined maximum pressure and a predetermined minimum pressure across a predetermined neutral pressure therebetween;
  a pressure medium source circuit means connected to said working chamber, for supplying said pressure medium to said working chamber of said cylinder;
  a pressure control valve means disposed within said pressure medium circuit means and variable in valve position between a first mode for increasing pressure of said pressure medium within said working chamber, a second mode for decreasing pressure in said pressure medium within said working chamber, and a third mode for maintaining said pressure of said pressure medium constant;
  a sensor mans for monitoring vehicle body attitude change for producing a vehicle body attitude change indicative sensor signal; and
  a controller means receiving said sensor signal for deriving a control signal for controlling said pressure control valve means in order to suppress attitude change in a normal mode of operation, said controller means detecting an abnormality of said sensor signal for switching operation mode from said normal mode to a fail-safe mode in which said control signal is derived irrespective of said sensor signal to adjust the pressure of said pressure medium within aid working chamber to a predetermined pressure level at or in the vicinity of said neutral pressure, measuring an elapsed time from initiation of the fail-safe mode of operation and checking the condition of said sensor means by reading said sensor signal and comparing the value of the read sensor signal with a reference value corresponding to said predetermined pressure level to detect a normal or an abnormal condition of said sensor means, after expiration of a predetermined period of time for resuming normal mode operation when said normal sensor means condition is detected and maintaining said fail-safe mode operation otherwise.

15. An actively controlled suspension system which is variable in suspension characteristics for performing bouncing suppressive control for suppressing vertical displacement between a vehicle body and a suspension member rotatably supporting a road wheel, comprising:
   a cylinder disposed between aid vehicle body and said suspension member, and defining therein a working chamber filled with a pressure medium variable in pressure between a predetermined maximum pressure and a predetermined minimum pressure across a predetermined neutral pressure therebetween;
   a pressure medium source circuit means connected to said working chamber, for supplying said pressure medium to said working chamber of said cylinder;
   a pressure control valve means disposed within said pressure medium circuit means and variable in valve position between a first mode for increasing pressure of said pressure medium within said working chamber, a second mode for decreasing pressure of said pressure medium within said working chamber, and a third mode for maintaining said pressure of said pressure medium constant;
   a sensor means for monitoring relative vertical displacement between said vehicle body and said suspension member to produce a vertical displacement indicative sensor signal; and
   a controller means receiving said sensor signal for deriving a control signal for controlling said pressure control valve means in order to suppress vertical displacement in a normal mode of operation, said controller means detecting an abnormality of said sensor signal for switching operation mode from said normal mode to a fail-safe mode in which said control signal is derived irrespective of said sensor signal to adjust the pressure of said pressure medium within said working chamber at a predetermined pressure level in the vicinity of said neutral pressure, measuring an elapsed time from initiation of said fail-safe mode of operation and checking the condition of said sensor means by reading said sensor signal and comparing the value of the read sensor signal with a reference value corresponding to said predetermined pressure level to detect a normal or an abnormal condition of said sensor means, after expiration of a predetermined period of time for resuming said normal mode of operation when said normal sensor means condition is detected and maintaining said fail-safe mode of operation otherwise.

* * * * *